United States Patent Office 3,553,273
Patented Jan. 5, 1971

3,553,273
BIS(FLUORODINITROMETHYL)ALKYLENE DIOLS
Horst G. Adolph and Mortimer J. Kamlet, Silver Spring, Md., assignors to the United States of America as represented by the Secretary of the Navy
No Drawing. Filed Feb. 26, 1965, Ser. No. 436,993
Int. Cl. C07c 31/18, 31/34
U.S. Cl. 260—633    12 Claims The invention described herein may be manufactured and used by or for the Government of the United States of America for governmental purposes without the payment of any royalties thereon or therefor.

This invention relates generally to a new class of high energy compounds and their preparation. More specifically the invention is directed to diols having one hydroxy group next to each of two terminal fluorodinitromethyl groups which are made by reacting fluorodinitromethane with aliphatic dialdehydes.

It is known that polynitromethanes such as nitroform add to aldehydes such as formaldehyde to give polynitrocarbinols. However, in order to obtain stable adducts of higher aldehydes and, in particular, dialdehydes, it is essential that the polynitromethyl group carry a stabilizing constituent.

Accordingly, it is an object of this invention to produce polynitrodiols which exhibit a high thermal stability and do not tend to dissociate into their components, dialdehyde and polynitromethane.

It is further an object of this invention to prepare polynitrodiols which have a high heat of detonation as an explosive and a high specific impulse as a propellant.

The objects of this invention are accomplished by reacting fluorodinitromethane with an aqueous solution of an aliphatic dialdehyde. The reaction is as follows:

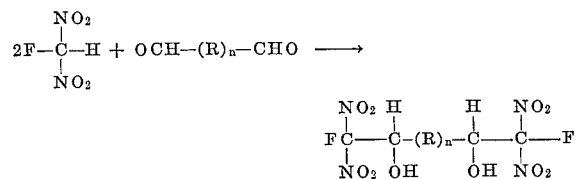

wherein R is alkylene and $n$ is 0 to 3.

The presence of fluorine is essential to this invention since it is the fluorine that gives the diols of this invention the high stability that prevents their dissociation. The fluorine also gives the diols and unexpected and unpredictable thermal stability that makes them especially valuable as high energy compounds. The analogous chlorine and bromine derivatives would not have either this stability towards dissociation or this high thermal stability. These analogous chlorine and bromine and derivatives also do not possess either a specific impulse or a heat of detonation that is high enough to make them valuable as high energy compounds.

As examples of suitable dialdehydes there may be mentioned glyoxal, malonaldehyde, succinaldehyde, glutaraldehyde, and the like. As examples of the diols that are produced by this invention there may be mentioned, 1,4-difluoro-1,1,4,4 - tetranitrobutanediol - 2,3, 1,5 - difluoro-1,1,5,5-tetranitropentanediol-2, 4, 1,6-difluoro - 1,1,6,6-tetranitrohexanediol - 2,5 - 1,7 - difluoro - 1,1,7,7 - tetranitroheptanediol-2,6, and the like. It is to be understood that the above-mentioned compounds are only illustrative of the many varieties of compounds that may be used in and are produced by this invention.

The general process of the invention comprises reacting fluorodinitromethane with an aqueous solution of a dialdehyde to produce the diol. Upon completion of the reaction the solution is acidified, extracted, and the extract is concentrated to obtain the diol. The temperature at which the reaction is carried out is usually between about −10° C. and 30° C., preferably between about 0° C. and 10° C. The pH of the solution is generally regulated between about 5 and 9, preferably between about 6.5 and 7.5. The fluorodinitromethane used in this invention is obtained by treating fluorodinitroethanol with a strong base and contacting the resulting salt with a strong mineral acid as described in application Ser. No. 357,018, filed Mar. 31, 1964, now U.S. Pat. No. 3,435,079.

The diols of this invention are useful as explosives with the short chain diols (butane and heptanediol) falling into the booster range and the higher homologues (hexane and heptanediol) being classed as high explosives. Since they are difunctional alcohols, the new compounds are also useful as components for the preparation of high energy polyesters, polyurethanes, and polyformals.

The following examples illustrate specific embodiments of the invention but it is to be understood that the scope of the invention is not to be limited thereto.

EXAMPLE I 1,4-difluoro-1,1,4,4-tetranitrobutanediol-2,3

17.7 g. of a 30% aqueous solution of glyoxal was diluted with 47 ml. water and cooled in an ice bath to about 5° C. Fluorodinitromethane, 25 g., was added with continued cooling. A saturated aqueous solution of potassium bicarbonate was then added dropwise to a pH of 6.5–7 and the mixture stirred one half hour at about 0° C. After this period all the fluorodinitromethane was dissolved. The solution was acidified with dilute sulfuric acid and saturated with sodium chloride which caused part of the product to precipitate. It may be filtered off or the mixture as a whole extracted with four 25 ml. portions of ether, the extract dried over magnesium sulfate and the solvent removed in vacuo. The residue was digested with a small amount of methylene chloride, the mixture cooled and filtered to give 21.5 g. crude diol, M.P. 175–180° C. One recrystallization from methylene chloride or benzene yielded 20.6 g. (67%) of M.P. 178–180° C.

Calc'd for $C_4H_4F_2N_4O_{10}$ (percent): C, 15.69; H, 1.31; F, 12.42; N, 18.31; M.W. 306.10. Found (percent): C, 15.5, 15.8; H, 1.8; F, 11.8, 11.7; N, 18.0, 17.8; M.W. (in benzene) 314, (X-ray difffraction) 301.

EXAMPLE II 1,5-difluoro-1,1,5,5-tetranitropentanediol-2,4

Sodium malonaldehyde was prepared from 1,1,3,3-tetraethoxypropane according to the procedure of Protopopova and Skoldinov, Chem. Abstr. 1958, 12754b. A solution of 5.5 g. sodium malonaldehyde in dil, sodium hydroxide (60 ml. water+1.5 ml. 2 N NaOH) was cooled to about 0° C. in an ice-salt bath. With stirring and continued cooling 15.45 g. fluorodinitromethane was added, most of which dissolved immediately. A saturated solution of potassium dihydrogenphosphate was then added dropwise until the mixture had a pH of about 7. After one half hour stirring at 0° C., the solution was acidified with dil, sulfuric acid, stirred for 15 minutes and extracted with four 50 ml. portions of methylene chloride. This extract was dried over magnesium sulfate and the solvent removed in vacuo. The remaining oil was held under a vacuum of 1 mm. for several hours, until it had solidified completely. This material, light brown, weighed 14.4 grams. It was broken up under and thoroughly digested with 25 ml. chloroform, filtered and the solid washed with 5 ml. chloroform on the filter. 10.8 g. diol, M.P. 74–77° C., was thus obtained; the filtrate in the refrigerator deposited another 0.6 g., M.P. 70–83° C.; the total crude yield was 57%.

This material may be purified by a vacuum sublimation (0.2 mm., 70° C.), followed by recrystallization from chloroform; M.P. 80–84° C.

Calc'd for $C_5H_6F_2N_4O_{10}$ (percent): C, 18.76; H, 1.89; F, 11.87; N, 17.50; M.W. 320.13. Found (percent): C, 19.0, 19.1; H, 2.0, 2.1; F, 10.8, 10.8; N, 17.1, 17.6; M.W. (in benzene) 312, 323.

EXAMPLE III

1,6-difluoro-1,1,6,6-tetranitrohexanediol-2,5

A mixture of 12 g. 2,5-dimethoxytetrahydrofurane, 80 ml. water, and 2 ml. 2 N sulfuric acid was stirred at 55° C. for 1 hour. This solution was then cooled below 5° C., 20 g. fluorodinitromethane was added with stirring and the mixture brought to a pH of 6.5 with saturated sodium bicarbonate solution. Stirring and cooling in an ice bath was continued for one half hour, then the reaction mixture was acidified with dilute sulfuric acid and extracted with methylene chloride (four 30 ml. portions). The extract was dried, the solvent, removed in vacuo (1 mm.), and the half solid residue triturated with 30 ml. chloroform. This mixture was left in the refrigerator overnight to give 20.2 g. crude diol, M.P. 70–85° C. After one to two recrystallizations from chloroform the material (15–17 g., 55–63%) melted from 80–100° C.

Calculated for $C_6H_8F_2N_4O_{10}$ (percent): C, 21.57; H, 2.41; F, 11.37; N, 16.77; M.W. 334.15. Found (percent): C, 22.2, 21.8; H, 2.7, 2.6; F, 10.7, 10.6; N, 16.1; M.W. (in chloroform) 336, 335.

Repeated fractional recrystallization of the above mixture of stereoisomers from chloroform gave two sharp melting fractions:

(A) M.P. 86–87° C. and (B) M.P. 90–92° C., 102–104° C. (isomophs). Found (A): C, 21.6, 22.3; H, 2.9, 3.0; F, 10.1, 10.2; N, 16.3, 16.3; M.W. (in acetonitrile) 337, 335.

(B): C, 22.2, 22.3; H, 2.9, 2.6; F, 10.6, 10.5; N, 16.3, 16.4; M.W. (in acetonitrile) 333, 330.

EXAMPLE IV

1,7-difluoro-1,1,7,7-tetranitroheptanediol-2,6

A solution of 40 g. 25% aqueous glutaraldehyde in 100 ml. water was chilled and 25 g. fluorodinitromethane was added. The mixture was stirred and coooled in an ice bath and the pH was adjusted to about 7 by dropwise addition of saturated potassium bicarbonate solution. After stirring for another 30 minutes at about 0° C., the solution was acidified with dilute sulfuric acid and extracted four times with a total of 200 ml. methylene chloride. Drying the extract and removing the solvent in vacuo gave 28.5 g. crude diol which was recrystallized from chloroform; 26 g. (74%), M.P. 78–101° C.

Calculated for $C_7H_{10}F_2N_4O_{10}$ (percent): C, 24.15; H, 2.90; F, 10.91; N, 16.09; M.W. 348.18. Found (percent): C, 24.3, 24.4; H, 2.9, 3.0; F, 10.1, 10.1; N, 15.8; M.W. (in chloroform) 357, 355.

Again the stereoisomers were obtained pure by fractional recrystallization of the mixture from chloroform. The higher melting isomer (A), M.P. 99–101° C., 106.5–108° C. (isomorphs), is the more abundant and less soluble and is readily isolated. Either one of the isomorphic forms may be obtained by appropriately seeding saturated solutions of the material. The second isomer (B) melted at 86–88° C. Found (A) (percent): C, 24.0, 24.3; H, 3.2; F, 10.3; N, 16.2, 15.5; M.W. (in benzene) 367, 357.

(B) (percent): C, 24.0, 24.4; H, 3.0; F, 10.3, 10.2; N, 15.8, 15.5; M.W. (in benzene) 363, 356.

Obviously many modifications and variations of the present invention are possible in the light of the above teachings. It is therefore to be understood that within the scope of the appended claims, the invention may be practiced otherwise than as specifically described.

Accordingly, what is claimed and desired to be secured by Letters Patent of the United States of America is:

1.

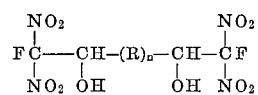

wherein R is alkylene and $n$ is 0 to 3.

2. 1,4-difluoro-1,1,4,4-tetranitrobutanediol-2,3.
3. 1,5-difluoro-1,1,5,5-tetranitropentanediol-2,4.
4. 1,6-difluoro-1,1,6,6-tetranitrohexanediol-2,5.
5. 1,7-difluoro-1,1,7,7-tetranitroheptanediol-2,6.
6. A method of producing a diol having the structure

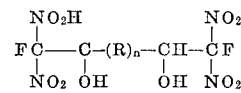

wherein R is alkylene and $n$ is 0 to 3 which comprises: adding fluorodinitromethane to an aqueous solution of a dialdehyde having the structure:

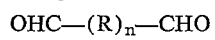

wherein R is alkylene and $n$ is 0 to 3, maintaining the mixture at a temperature between about $-10°$ C.$+30°$ C., and recovering the resulting diol.

7. The process of claim 6 wherein the temperature is regulated between the 0° C. and 10° C.

8. The process of claim 6 wherein the pH is regulated between about 5 and 9.

9. The process of claim 6 wherein said dialdehyde is glyoxal.

10. The process of claim 6 wherein said dialdehyde is malonaldehyde.

11. The process of claim 6 wherein said dialdehyde is succinaldehyde.

12. The process of claim 6 wherein said dialdehyde is glutaraldehyde.

References Cited

UNITED STATES PATENTS 2,999,118   9/1961   Bachman et al. _____ 260—633

LELAND A. SEBASTIAN, Primary Examiner

U.S. Cl. X.R.

149—88